(12) United States Patent
Rahm et al.

(10) Patent No.: US 12,168,425 B2
(45) Date of Patent: Dec. 17, 2024

(54) BRAKING ARRANGEMENT, VEHICLE COMPRISING SUCH A BRAKING ARRANGEMENT, AND METHOD OF CONTROLLING THE BRAKING ARRANGEMENT

(71) Applicant: Volvo Truck Corporation, Gothenburg (SE)

(72) Inventors: Fredrik Rahm, Hörby (SE); Tove Audhav, Landvetter (SE); Vijai Shankar Bhavani Shankar, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 337 days.

(21) Appl. No.: 17/741,520

(22) Filed: May 11, 2022

(65) Prior Publication Data

US 2022/0371566 A1    Nov. 24, 2022

(30) Foreign Application Priority Data

May 21, 2021   (EP) .................................... 21175347

(51) Int. Cl.
   *B60T 13/68*       (2006.01)
   *B60T 13/26*       (2006.01)
   (Continued)

(52) U.S. Cl.
   CPC .......... *B60T 13/683* (2013.01); *B60T 13/268* (2013.01); *B60T 13/741* (2013.01); *B60T 17/002* (2013.01); *B60T 2250/04* (2013.01)

(58) Field of Classification Search
   CPC .... B60T 13/268; B60T 13/683; B60T 13/741; B60T 17/002; B60T 17/02;
   (Continued)

(56) References Cited

U.S. PATENT DOCUMENTS

| | | |
|---|---|---|
| 3,395,949 A | 8/1968 | Kun |
| 2003/0068538 A1 | 4/2003 | Lahiff |

(Continued)

FOREIGN PATENT DOCUMENTS

| | | |
|---|---|---|
| CN | 101331042 A | 12/2008 |
| CN | 107107896 A | 8/2017 |

(Continued)

OTHER PUBLICATIONS

Extended European Search Report for European Patent Application No. 21175347.0, mailed Nov. 5, 2021, 11 pages.

(Continued)

*Primary Examiner* — Robert A. Siconolfi
*Assistant Examiner* — San M Aung
(74) *Attorney, Agent, or Firm* — Withrow & Terranova, PLLC

(57) ABSTRACT

The present invention relates to a braking arrangement for a vehicle, the braking arrangement comprising an electric machine electrically connectable to an electric power source, a brake compressor positioned in an air flow conduit, the brake compressor being configured to pressurize a flow of air and to exhaust the pressurized flow of air, and a compressor shaft mechanically connecting the electric machine and the brake compressor to each other, wherein the electric machine is configured to generate a torque on the compressor shaft for operating the brake compressor to pressurize the flow of air, the braking arrangement further comprising an air bearing arrangement, the air bearing arrangement being fluidly connectable to a pressurized brake air tank of the vehicle via an air bearing conduit, wherein the air bearing arrangement is suspending the compressor shaft to at least one of the electric machine and the brake compressor.

12 Claims, 4 Drawing Sheets

(51) Int. Cl.
  *B60T 13/74*   (2006.01)
  *B60T 17/00*   (2006.01)
(58) Field of Classification Search
  CPC ...... B60T 2250/04; F02B 33/34; F02B 39/10; F02C 6/12; F01D 25/16; F01D 25/22; F04D 13/12; F04D 25/062; F04D 25/16; F04D 29/0413; F04D 29/043; F04D 29/047; F04D 29/0513; F04D 29/056; F04D 29/057
  USPC .......................................................... 303/15
  See application file for complete search history.

(56) References Cited

U.S. PATENT DOCUMENTS

| | | | | |
|---|---|---|---|---|
| 2007/0137626 | A1* | 6/2007 | Turner | .................... F02B 33/34 123/559.3 |
| 2009/0126363 | A1* | 5/2009 | Arnold | ................ F04D 29/4206 60/605.1 |
| 2010/0065129 | A1 | 3/2010 | Schnittger et al. | |
| 2012/0055148 | A1 | 3/2012 | Leonard et al. | |
| 2013/0142671 | A1* | 6/2013 | Stein | ........................ F01D 25/22 417/231 |
| 2020/0182137 | A1* | 6/2020 | Carr | ........................ F02B 39/12 |

FOREIGN PATENT DOCUMENTS

| | | |
|---|---|---|
| GB | 2416806 A | 2/2006 |
| JP | S6220604 A | 1/1987 |
| JP | 2009168241 A | 7/2009 |

OTHER PUBLICATIONS

First Office Action for Chinese Patent Application No. 202210536154.7, mailed Mar. 25, 2024, 19 pages.

* cited by examiner

BRAKING ARRANGEMENT, VEHICLE COMPRISING SUCH A BRAKING ARRANGEMENT, AND METHOD OF CONTROLLING THE BRAKING ARRANGEMENT

RELATED APPLICATIONS

The present application claims priority to European Patent Application No. 21175347.0, filed on May 21, 2021, and entitled "BRAKING ARRANGEMENT, VEHICLE COMPRISING SUCH A BRAKING ARRANGEMENT, AND METHOD OF CONTROLLING THE BRAKING ARRANGEMENT," which is incorporated herein by reference in its entirety.

FIELD OF THE DISCLOSURE

The present invention relates to a braking arrangement for a vehicle at least partially propelled by an electric traction motor. The present invention also relates to a vehicle comprising such a braking arrangement, as well as a method of operating the braking arrangement. Although the invention will mainly be directed to a vehicle in the form of a truck using a fuel cell for generating electric power to an electric traction motor, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or an electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a cylinder decompression brake, a retarder, etc. However, for an electric vehicle, the auxiliary braking functionality can be a dimensioning factor for the cooling system since the cooling capacity of e.g. a fuel cell electric vehicle (FCEV) as well as a battery electric vehicle (BEV) is a limiting factor. The reason is that for such type of vehicles, the auxiliary braking places a lot of energy in the cooling system.

Furthermore, the auxiliary brakes are conventionally applied at start-stop situations, i.e. the auxiliary brakes are used at short usage periods and sometimes on a frequent basis.

There is thus a desire to provide an improved braking arrangement for an electrically propelled vehicle which is able to sustain the operational loads during these driving situations.

SUMMARY

It is thus an object of the present invention to at least partially overcome the above described deficiencies.

According to a first aspect, there is provided a braking arrangement for a vehicle, the braking arrangement comprising an electric machine electrically connectable to an electric power source, a brake compressor positioned in an air flow conduit, the brake compressor being configured to pressurize a flow of air and to exhaust the pressurized flow of air, and a compressor shaft mechanically connecting the electric machine and the brake compressor to each other, wherein the electric machine is configured to generate a torque on the compressor shaft for operating the brake compressor to pressurize the flow of air, the braking arrangement further comprising an air bearing arrangement, the air bearing arrangement being fluidly connectable to a pressurized brake air tank of the vehicle via an air bearing conduit, wherein the air bearing arrangement is suspending the compressor shaft to at least one of the electric machine and the brake compressor.

The present invention is based on the realization that an air bearing arrangement is particularly suitable for a braking arrangement as the one described above, i.e. a braking arrangement using a brake compressor mechanically connected to an electric machine. In detail, by connecting the air bearing arrangement to a pressurized air tank of the vehicle, the inventors have realized that the air bearing arrangement can be arranged to suspend a shaft which is not suspended axially by e.g. another compressor or turbine, since the pressure levels of the air provided by the pressurized air tank of the vehicle enables the use of the air bearing arrangement for the above described compressor shaft. The compressor shaft is thus preferably at one end connected to the brake compressor, and at the other end connected to the electric machine. As an alternative, the braking arrangement may comprise two brake compressors arranged on the compressor shaft. In such a case, the electric machine is preferably arranged between the brake compressors. Further, the electric machine may be arranged at a position at which it encloses the compressor shaft. Thus, the compressor shaft is in such case arranged through the electric machine.

An advantage is that the air bearing arrangement can safeguard that a full air film and lift off between bearing surfaces is provided, and the risk of film brake through for sudden loads or bounces during vehicle operation is hereby reduced compared to a conventional oil film bearing. Furthermore, the use of an air bearing arrangement enables the compressor shaft to be mounted vertically between the brake compressor and the electric machine, also increasing bearing load capacity. Air bearings are advantageous due to their low friction abilities, increased reliability, higher speed capability, reduced maintenance requirement, reduction of contaminations, etc.

Still further, the bearing suspending the compressor shaft is exposed to high frequency load operation as the shaft is used during braking, and the shaft is thus operated by frequent actuation/de-actuation. A conventional oil film bearing is hereby exposed to wear. However, an air bearing arrangement arranged at this position, with the supply of high-pressure air, can provide the advantage of reducing wear of the bearing compared to the conventional oil film bearing arrangement. Further, when pressurized air is used as an air foil film, additional components for oil are no longer needed, and there is no need of oil change for such component. Also, using pressurized air from the pressurized brake air tank of the vehicle, the pressurized air generated in the brake compressor can be used for other purposes than to supply the pressurized air to an air bearing arrangement. Moreover, the pressurized brake air tank of the vehicle receives the pressurized air from another compressor, different from the above-described brake compressor, of the vehicle, the compressor connected to the pressurized brake air tank can be used as an additional energy dissipated during regenerative braking of the braking arrangement as it need to "fill up" the pressurized brake air tank during braking, and thus dissipate energy.

The air bearings using vehicle air further have the advantage of reducing the minimum shaft speed when the brake compressor can be used, since high air pressure in the bearing is continuously available. This means a more controllable braking event, with less power steps resulting in a smother operation of the vehicle. Hereby, brake blending between the braking arrangement and other vehicle brake systems can be optimized. This also improves the overall energy management for batteries arranged in the vehicle.

According to an example embodiment, the braking arrangement may further comprise an air bearing valve positioned in the air bearing conduit for controllable supply of a flow of pressurized air to the air bearing arrangement. Preferably, and according to an example embodiment, the braking arrangement may further comprise a control unit connected to the air bearing valve, the control unit being configured to control the air bearing valve between a first state in which the air bearing valve is closed and pressurized air is prevented from reaching the air bearing arrangement, and a second state in which the air bearing valve is open and pressurized air from the pressurized brake air tank is supplied to the air bearing arrangement.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Hereby, pressurized air can be supplied to the air bearing arrangement during use thereof. Hence, when no braking occurs and the electric machine is not operating the brake compressor, the air bearing arrangement is arranged in a "resting" state where no air is supplied thereto. The high pressure air in the brake air tank can thus be used for e.g. other auxiliaries of the vehicle.

According to an example embodiment, the control unit may be configured to receive a signal indicative of a desired vehicle speed for the vehicle, and control the air bearing valve to transition from the first state to the second state before the vehicle initiates a control of the vehicle speed.

The signal indicative of a desired vehicle speed may relate to a desired reduction of vehicle speed, or to maintain a desired vehicle speed. In the latter case, the vehicle may need to provide auxiliary braking to maintain a desired vehicle speed when e.g. operating the vehicle in a downhill slope.

An advantage is thus that the pressurized supply of air is provided to the air bearing arrangement only when the air bearing arrangement will be actuated. In detail, since the pressurized air is supplied to the air bearing arrangement before the vehicle initiates e.g. the reduction of vehicle speed, the air bearing arrangement receives pressurized air before rotation of the compressor shaft and is thus fully operational at a predetermined time period before usage. Hence, when e.g. a braking command is issued, an air bearing film will be generated, and the compressor shaft can initiate rotation for operating the brake compressor.

The air bearing valve may also be controlled to transition from the first state to the second state when there is a desire to dissipate electrical energy using the braking arrangement.

According to an example embodiment, the control unit may further be connected to the electric machine, the control unit being configured to control the electric machine to generate a torque on the compressor shaft for operating the brake compressor at a predetermined time period after the air bearing valve assumes the second state.

Hereby, it is further assured that the air bearing arrangement will be operational before usage.

According to an example embodiment, the control unit may be further configured to receive a signal indicative of an upcoming driving condition for the vehicle, determine a vehicle braking requirement for operating the vehicle during the upcoming driving condition, compare the vehicle braking requirement with a predetermined threshold limit, and control the air bearing valve to assume the second state throughout the upcoming driving condition when the vehicle braking requirement exceeds the predetermined threshold limit. This is particularly advantageous in driving situations where it is determined that auxiliary braking will occur repeatedly with a high frequency. This is also advantageous for rapidly actuate the auxiliary brake since it enables for a decreased response time during the braking event. The ramp up time of the bearing is reduced whereby the brake can initiate its braking action almost instantaneously. According to an example embodiment, the upcoming driving condition may comprise road topology data at a future point in time. Typically, this situation may occur when operating the vehicle in a hilly terrain, or when the battery level is above a certain threshold level and energy dissipation is required.

According to an example embodiment, the braking arrangement may further comprise an air filter positioned in the air bearing conduit. Particles can hereby be prevented from reaching the air bearing arrangement, thereby improving the operational capacity as well as reducing wear.

According to an example embodiment, the braking arrangement may further comprise an air drying arrangement positioned in the air bearing conduit. Water and humidity are hereby prevented from being present in the air film of the air bearing arrangement.

According to an example embodiment, the air bearing arrangement may comprise an air journal bearing. An air journal bearing acts as a radial air bearing and is thus advantageously suspending radial loads occurring during operation.

According to an example embodiment, the air bearing arrangement may comprise an air thrust bearing. An air thrust bearing acts as an axial air bearing and is thus advantageously suspending axial loads occurring during operation. The air bearing arrangement may comprise a combination of air journal bearing(s) and air thrust bearing(s).

According to an example embodiment, the braking arrangement may further comprise an electrical brake resistor arrangement arranged in the air flow conduit at a position downstream the brake compressor.

By using an electrical brake resistor arrangement receiving air from the brake compressor, the energy from the electric source can be supplied to the brake compressor as well as to the electrical brake resistor arrangement which, by means of the received electricity, heats the air and releases it to the ambient environment. The air received into the electrical brake resistor arrangement is thus heated and a braking action is performed by the braking arrangement. The heated air can in turn be used to lower the cooling demands of a cooling system for the vehicle, thereby even further assist the cooling system. Thus, by means of the air directed into the braking arrangement, heated coolant can be cooled, e.g. the temperature of the coolant of the vehicle's cooling system can be reduced, whereby the heated air is exhausted to the ambient environment. The intake air can also be arranged for direct cooling of vehicle components, or supplied to e.g. a heat exchanging process.

The brake compressor is thus "burning off" electric energy for performing a braking operation of the vehicle, whereby the electric energy gained during such an event is placed into a raised temperature of air in the electrical brake resistor arrangement. This is particularly advantageous when e.g. a vehicle battery is full and the cooling system has reached its limit, i.e. the cooling system is unable to provide any cooling. A further advantage is thus that the existing cooling system can be downsized.

According to an example embodiment, the braking arrangement may further comprise an air heating arrangement arranged in the air flow conduit at a position upstream the brake compressor for heating the air supplied to the brake compressor.

The inventors have also unexpectedly realized that by increasing the temperature of the air before it reaches the brake compressor will enable the brake compressor as well as the electrical brake resistor arrangement to supply and "burn off" an even further amount of electric energy from the electric source, thereby increasing the brake capacity even further as the cooling system will be less strained during a braking event. As indicated above, the overall cooling demand for the vehicle can hereby be reduced.

According to an example embodiment, the air heating arrangement may be formed by the electric machine, wherein air is received, and heated, by the electric machine and supplied to the brake compressor. Hereby, the electric machine will in turn be cooled down, thereby presenting a combined technical advantage. As an alternative, and according to an example embodiment, the air heating arrangement may be formed by a heat exchanger connected to a liquid cooling system. Also, an air fan or additional compressor can be positioned upstream the electric machine. Hence, air is received by the air fan or additional compressor before supplied to the electric machine. A pre-boosting of the air is generated which makes the potential power density for the electric machine more efficient, i.e. increased, whereby the above described brake compressor can also be downsized.

According to an example embodiment, the braking arrangement may further comprise an air flow restriction arrangement arranged in the air flow conduit at a position downstream the brake compressor. The air flow restriction arrangement here assists the braking arrangement to keep the air pressure level at a suitable pressure level for obtaining a desired braking effect.

According to a second aspect, there is provided a vehicle at least partially propelled by an electric traction motor, wherein the vehicle comprises a pressurized brake air tank arranged to supply pressurized air to a pneumatically controlled wheel brake connected to a wheel of the vehicle, and a braking arrangement according to any one of the embodiments described above in relation to the first aspect, wherein the pressurized brake air tank is arranged in fluid communication with the air bearing arrangement.

Effects and features of the second aspect are largely analogous to those described above in relation to the first aspect.

According to a third aspect, there is provided a method of controlling a braking arrangement of a vehicle, the braking arrangement comprising an electric machine electrically connected to an electric power source of the vehicle, a brake compressor positioned in an air flow conduit of the brake compressor, and a compressor shaft mechanically connecting the electric machine and the brake compressor to each other, wherein the electric machine is configured to generate a torque on the compressor shaft, the braking arrangement further comprising an air bearing arrangement fluidly connected to a pressurized brake air tank of the vehicle, wherein the air bearing arrangement is suspending the compressor shaft to at least one of the electric machine and the brake compressor, the method comprising determining an upcoming braking event for the vehicle, controlling a supply of flow of air from the pressurized brake air tank to the air bearing arrangement before initiation of braking event, and controlling the electric machine to generate a torque on the compressor shaft for operating the brake compressor to pressurize a flow of air at a predetermined time period after the supply of the flow of air from the pressurized brake air tank to the air bearing arrangement has been initiated.

The braking event should be construed as an event in which there is a desire to dissipate energy, reduce the vehicle speed or maintain the vehicle speed at a desired speed. Thus, when controlling the supply of flow of air, the braking arrangement can be arranged to dissipate electric energy. The braking even can thus be an event where the vehicle is maintaining a desired speed during downhill driving. In such situation, the vehicle is maintaining a steady speed where braking is performed for not exceeding the desired speed.

The upcoming braking event should be construed as a point in time when a signal is received indicating that braking is desired or will be desired. The upcoming braking event can hereby be a predictive condition or a non-predictive condition.

Effects and features of the third aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present invention.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
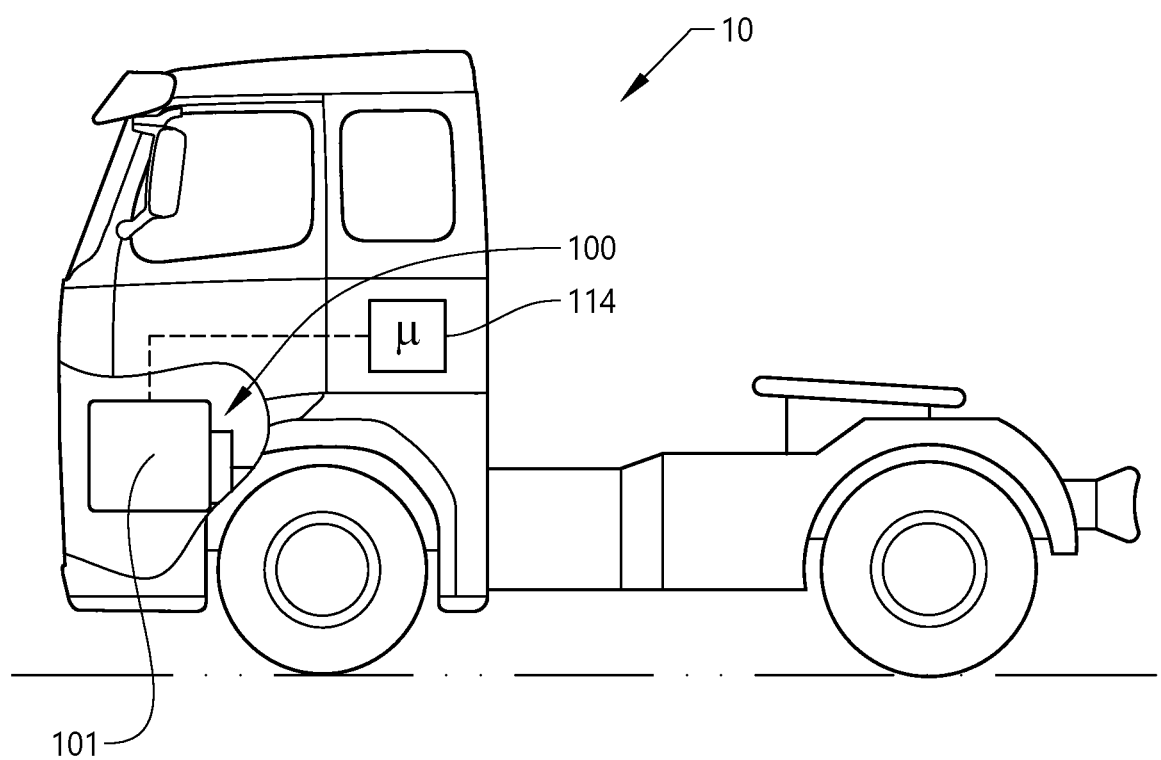
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric machine arranged to receive electric power from a battery or directly from a fuel cell system. The vehicle 10 also comprises a control unit 114 for controlling various operations as will also be described in further detail below, and a braking arrangement (not shown in detail in FIG. 1) arranged to dissipate electric energy and for obtaining an auxiliary braking action of the vehicle.

Figure 2:
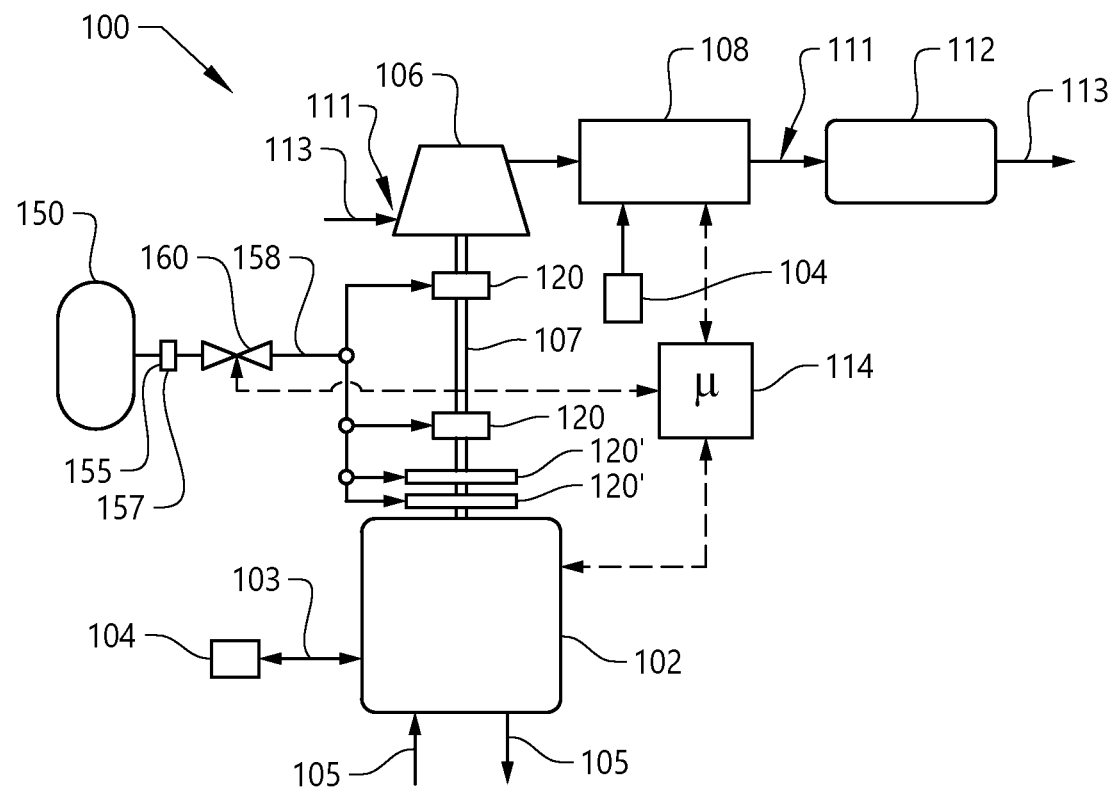
FIG. 2 is a schematic illustration of a braking arrangement according to an example embodiment.

In order to describe the braking arrangement in further detail, reference is made to FIG. 2 which is a schematic illustration of a braking arrangement according to an example embodiment. The braking arrangement 100 depicted in FIG. 2 comprises an electric machine 102 arranged to receive electric power 103 from an electric power source 104. The electric power source 104 can be, for example, a vehicle battery or a fuel cell system. The electric power source 104 can, as another option, be formed by an electric inverter, or other electric machine, etc. Thus, the purpose of the electric power source is to supply electric power to the electric machine. The electric power source can, according to an example, also be arranged to receive electric power from the traction motor 101 of the vehicle. Moreover, the electric machine 102 can also be connected to a cooling system 105 of the vehicle 10, or an air-cooling system. The cooling system 105 may thus be either a liquid cooling system or an air cooling system.

The braking arrangement 100 further comprises a brake compressor 106 mechanically connected to, and operated by, the electric machine 102. As is illustrated in FIG. 2. The brake compressor 106 is mechanically connected to the electric machine 102 by a compressor shaft 107. The brake compressor 106 serves, amongst other things, the purpose of pressurizing and supplying a flow of air 113. The brake compressor 106 is thus arranged to significantly increase the pressure level of the air, as well as to increase the temperature level and flow velocity of the air.

Furthermore, the braking arrangement 100 comprises an air bearing arrangement 120, 120' suspending the compressor shaft 107 to the electric machine 102 and/or to the brake compressor 106. The air bearing arrangement 120, 120' exemplified in FIG. 2 comprises two air journal bearings 120 and two air thrust bearings 120'. The air bearing arrangement 120, 120' is arranged in fluid communication with a pressurized brake air tank 150 of the vehicle 10 by means of an air bearing conduit 158. The pressurized brake air tank 150 may, as a non-limiting example, form part of the braking arrangement 100. The pressurized brake air tank 150 thus contains pressurized air which is used for e.g. pneumatically controlled wheel brakes (not shown) of the vehicle 10. As can also be seen in FIG. 2, the air bearing arrangement 120, 120' is connected to the pressurized brake air tank 150 via an air bearing valve 160 for controllable supply of pressurized air from the pressurized brake air tank 150 to the air bearing arrangement 120, 120'. According to the example embodiment depicted in FIG. 2, the braking arrangement 100 also comprises an air filter 155 and an air-drying arrangement 157 in the air bearing conduit 158. Although not depicted, a passive or active pressure regulator may be arranged between the air bearing arrangement and the pressurized brake air tank 150 for controlling the pressure level of the pressurized air supplied to the air bearing arrangement. Further details and example embodiments of the air bearing arrangement 120, 120' will be presented below with reference to FIGS. 3-5.

The brake compressor 106 is arranged in an air flow conduit 111 of the braking arrangement 100. The braking arrangement 100 depicted in FIG. 2 may further comprise an electrical brake resistor arrangement 108 in the air flow conduit 111. The electrical brake resistor arrangement 108 is thus preferably arranged in downstream fluid communication with the brake compressor 106 and receives the pressurized air flow from the brake compressor 106. The electrical brake resistor arrangement 108 comprises an electrical brake resistor and is electrically connected to the above described electric power source 104. In FIG. 2, the electric power source 104 is depicted as two separate components for simplification. It should however be readily understood that the electric power source could be either a single component or separate components. The electrical brake resistor arrangement 108 thus receives the pressurized air from the brake compressor, whereby the air is heated in the electrical brake resistor by the electric power received from the electric power source 104. The air is thereafter supplied towards the ambient environment. According to the example embodiment depicted in FIG. 2, the braking arrangement 100 may also comprise an air flow restriction arrangement 112 between the electrical brake resistor arrangement 108 and the ambient environment for maintaining a suitable pressure level within the braking arrangement. The air flow restriction arrangement 112 may comprise a muffler.

Although not depicted in the figures, the braking arrangement 100 may additionally comprise an air heating arrangement arranged in upstream fluid communication with the brake compressor 106. The air heating arrangement may be a heat exchanger connected to the cooling system of the vehicle 10. Thus, the heat exchanger receives liquid fluid from the cooling system and pre-heats the air before it is delivered to the brake compressor 106. The heat exchanger is preferably an air-to-liquid heat exchanger but may, as an alternative, be an air-to-air heat exchanger which uses relatively warm air to heat the air that is supplied to the brake compressor 106. As a further example embodiment, such air heating arrangement may alternatively be formed by the electric machine 102 itself, wherein air is received, and heated, by the electric machine 102 and subsequently supplied to the brake compressor 106.

The braking arrangement 100 also comprises the above described control unit 114. The control unit 114 is preferably connected to the electric machine 102, the air bearing valve 160, and the electrical brake resistor arrangement 108. Hereby, the control unit 114 can control operation of these components. The control unit 114 should however be construed as being connected/connectable to other components of the braking arrangement, such as to the electric power source 104 and to the brake compressor 106. The control unit 114 and functional operations thereof will be described in further detail below.

The control unit 114 preferably comprises processing circuitry including a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with a e.g. a primary vehicle control unit, or other control units of the vehicle, which is/are arranged to detect an upcoming traffic situation, road topology, etc. The information from the primary vehicle control unit can thus be transmitted to the above described control unit 114 for decision making of the control unit 114.

By means of the braking arrangement 100 depicted in FIG. 2 and described above, electric power from the electric power source 104 is dissipated by electrifying the brake compressor 106 and the electrical brake resistor arrangement 108, whereby the electric power for the brake compressor 106 as well as for the electrical brake resistor arrangement 108 is used for heating the air. The electric power is thus dissipated into the air which is released towards the ambient environment, or other components of the vehicle in need of heating.

Figure 3:
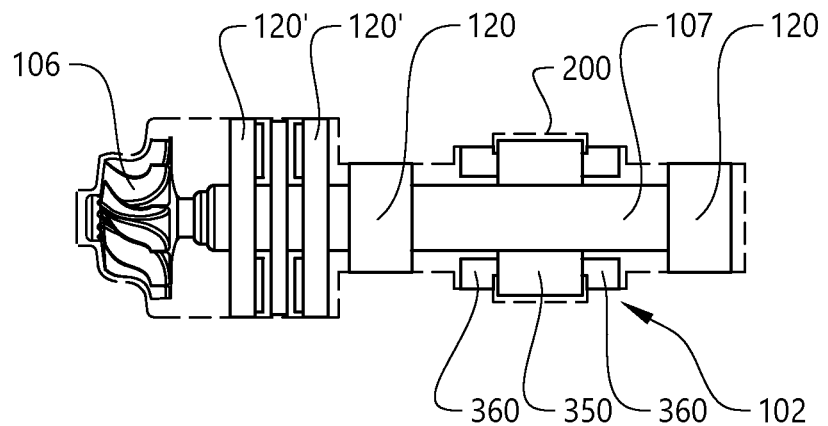
FIG. 3 is an example embodiment schematically illustrating a compressor shaft of the FIG. 2 braking arrangement.

Reference is now made to FIG. 3, which is an example embodiment schematically illustrating the compressor shaft 107 described above in relation to FIG. 2. The air bearing arrangement comprises air journal bearings 120 and thrust bearings 120'. Example embodiment of the air journal bearing, and the thrust bearing will be given below in relation to the description of FIGS. 4 and 5, respectively. In the exemplified embodiment of FIG. 3, the electric machine 102 is arranged on the compressor shaft 107 between a pair of air journal bearings 120. As indicated above, the compressor shaft 107 is suspended by the air bearing arrangement 120, 120'. The thrust bearings 120' are in FIG. 3 arranged between the electric machine 102 and the brake compressor 106. The air bearing arrangement 120, 120' is preferably arranged between the compressor shaft 107 and a stationary housing 200. The stationary housing is preferably the housing of the electric machine 102. The compressor shaft 107 can hereby rotate relative to the stationary housing 200 by means of the air bearing arrangement 120, 120'. As is also indicated, the electric machine 102 comprises a rotor 350 connected to the compressor shaft 107 and a stator 360 connected to the stationary housing.

As indicated above, and according to the exemplified embodiment of FIG. 3, the air bearing arrangement comprises air journal bearing(s) 120 and air thrust bearing(s) 120'. An example embodiment of an air journal bearing will be given below with reference to FIG. 4, while an example embodiment of an air thrust bearing will be given below with reference to FIG. 5. The air journal bearing 120 a radial bearing which is arranged to suspend radial loads from the compressor shaft 107 during operation, while an air thrust bearing is an axial bearing which is arranged to suspend axial loads from the compressor shaft 107 during operation.

Figure 4:
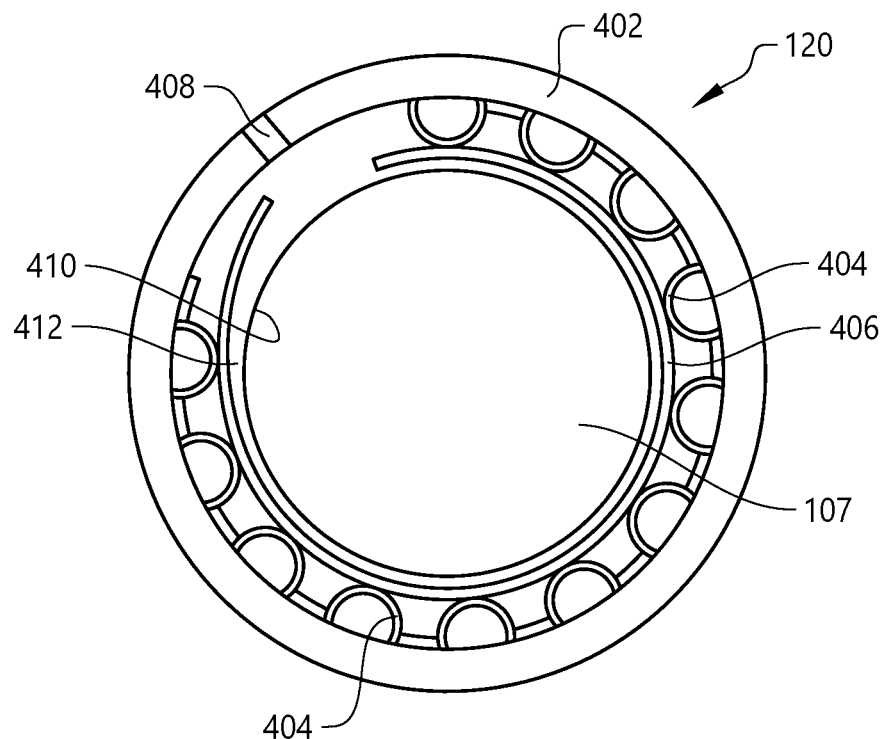
FIG. 4 is a schematic illustration of an air bearing arrangement according to an example embodiment.

In order to describe the air journal bearing 120 according to an example embodiment, reference is made to FIG. 4. The exemplified air journal bearing 120 comprises an outer bearing sleeve 402 at which inner surface a plurality of bump foils 404 is provided. The outer bearing sleeve 402 is thus fixed to the above described housing 200. Further, a top foil 406 is provided at the other side of the bump foil 404 compared to the outer bearing sleeve 402 as seen in the radial direction of the air journal bearing 120. Moreover, an air inlet portion 408 is provided in the bearing sleeve 402. Hereby, pressurized air from the pressurized brake air tank 150 can be supplied into the air journal bearing through the air inlet portion 408.

Moreover, the air journal bearing 120 comprises a radial air gap 410 extending in the circumferential direction of the air journal bearing 120. The radial air gap 410 is arranged between the top foil 406 and an inner bearing sleeve 412, which inner bearing sleeve 412 is connected to the compressor shaft 107. It should however be readily understood that the envelope surface of the compressor shaft 107 may itself act as an inner bearing sleeve. In such a case, the air journal bearing 120 does not contain any separate inner bearing sleeve 412.

In the air journal bearing 120 depicted in FIG. 4, the outer bearing sleeve 402, the bump foils 404, and the top foil 406 are stationary components, while the inner bearing sleeve 412 rotates with the compressor shaft 107 during operation. During operation, pressurized air is supplied through the air inlet portion 408 and into the radial air gap 410. At an initial stage, the compressor shaft 107 is preferably arranged eccentric within the air journal bearing 120. When pressurized air is supplied into the radial air gap 410, and the compressor shaft 107 starts to rotate, an air film is formed within the radial air gap 410, and the compressor shaft further pressurize the air film by rotating with some eccentricity.

It should be readily understood that the omission of bump foils and a rather harsh cut-out of the top foil as depicted in FIG. 4 is merely for illustrative purposes. Hence, the air journal bearing 120 may comprise bump foils evenly distributed along the circumferential direction of the air journal bearing 120, and the top foil 406 may contain a small cut-out for allowing pressurized air to enter the radial air gap 410. In a similar vein, the air journal bearing may also contain two or more air inlet portions for allowing pressurized air into the radial air gap 410.

Figure 5:
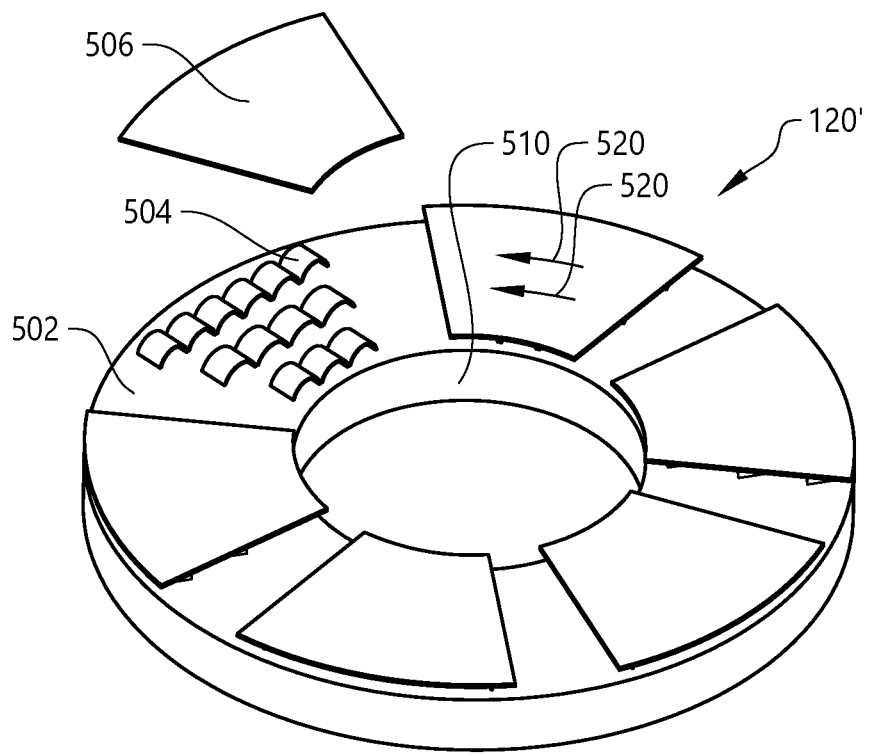
FIG. 5 is a schematic illustration of an air bearing arrangement according to another example embodiment.

Turning now to FIG. 5, which is a schematic illustration of an air bearing arrangement according to another example embodiment. In detail, FIG. 5 illustrates an air thrust bearing 120' according to an example embodiment. The air thrust bearing 120' comprises a base plate 502 comprising a plurality of bump foils 504. The air thrust bearing 120' also comprises a top foil 506 arranged on an opposite side of the bump foils 504 compared to the base plate 502. The air thrust bearing 120' further comprises a radial inner surface 510 encircling, but not in contact with, the compressor shaft 107. The top foil 506 is thus in abutment with the bump foils 504. During operation, pressurized 520 air is supplied onto the top foil 506 surface facing away from the bump foils 504. The base plate 502, the bump foils 504 and the top foil 506 are thus stationary components, wherein the base plate 502 is preferably fixated to the above described housing 200. Although not depicted, the compressor shaft 107 is thus connected to, or comprises, a rotor disc, wherein the air film is generated between the top foil 506 and the rotor disc in order to enable a rotation of the compressor shaft 107.

Figure 6:
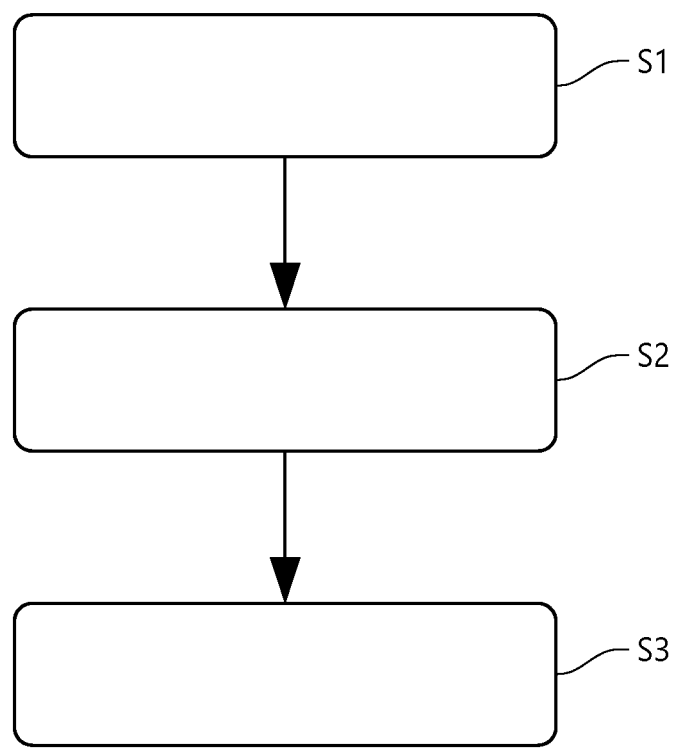
FIG. 6 is a flow chart of a method of controlling the braking arrangement according to an example embodiment.

In order to describe the operation of the braking arrangement 100, reference is made to FIG. 6, which is a flow chart of a method of controlling the braking arrangement according to an example embodiment.

During operation, the control unit 114 described above receives a signal indicative of desire to brake or to dissipate electrical energy. Hence, an upcoming braking event is determined S1 in which the vehicle requires braking to be performed. When there is a desire to brake, the supply of flow of pressurized air from the pressurized brake air tank 150 to the air bearing arrangement 120, 120' is controlled S2 to be initiated before initiation of the braking event takes place. This is preferably executed by the control unit 114, which controls the air bearing valve 160 from a first state in which the air bearing valve is closed and pressurized air is prevented from reaching the air bearing arrangement 120, 120, to a second state in which the air bearing valve 160 is open and pressurized air from the pressurized brake air tank 150 is supplied to the air bearing arrangement 120, 120'.

A predetermined time period after the air bearing valve has assumed the second state, i.e. before the vehicle 10 initiates a control of the vehicle speed, the control unit 114 controls S3 the electric machine 102 to generate a torque on the compressor shaft 107 for operating the brake compressor 106. Hereby, the auxiliary braking described above can be initiated and the vehicle speed can be controlled. By controlling the vehicle speed, the speed can preferably either be reduced or, when operating the vehicle in a downhill slope, maintain a desired vehicle speed.

The control unit 114 may preferably be configured to receive a signal indicative of an upcoming driving condition for the vehicle 10. The upcoming driving condition may, for example, relate to road topology data at a future point in time, or indicative of a vehicle operation taking place within a short instance of time. The control unit 114 is hereby configured to determine a vehicle braking requirement for operating the vehicle during the upcoming driving condition. The control unit 114 compares the vehicle braking requirement with a predetermined threshold limit. The predetermined threshold limit may relate to a number of braking events within a preset time period. When the vehicle braking requirement exceeds the predetermined threshold limit, the control unit controls the air bearing valve to assume the second state throughout the upcoming driving condition. Thus, when it is determined that the vehicle will need to perform excessive braking during an upcoming time period, the valve is hereby arranged to assume the second state throughout the entire time period.

It is to be understood that the present disclosure is not limited to the embodiments described above and illustrated in the drawings; rather, the skilled person will recognize that many changes and modifications may be made within the scope of the appended claims.

The invention claimed is:

1. A braking arrangement for a vehicle comprising:
an electric machine electrically connectable to an electric power source,
a brake compressor positioned in an air flow conduit, the brake compressor being configured to pressurize a flow of air and to exhaust the pressurized flow of air, and
a compressor shaft mechanically connecting the electric machine and the brake compressor to each other,
wherein the electric machine is configured to generate a torque on the compressor shaft for operating the brake compressor to pressurize the flow of air,
the braking arrangement further comprising:
an air bearing arrangement, the air bearing arrangement being fluidly connectable to a pressurized brake air tank of the vehicle via an air bearing conduit,
wherein the air bearing arrangement is suspending the compressor shaft to at least one of the electric machine and the brake compressor,
an air bearing valve positioned in the air bearing conduit for controllable supply of a flow of pressurized air to the air bearing arrangement, and
a control unit connected to the air bearing valve, the control unit being configured to control the air bearing valve between a first state in which the air bearing valve is closed and pressurized air is prevented from reaching the air bearing arrangement, and a second state in which the air bearing valve is open and pressurized air from pressurized brake air tank is supplied to the air bearing arrangement,
wherein the control unit is further configured to:
receive a signal indicative of an upcoming driving condition for the vehicle,
determine a vehicle braking requirement for operating the vehicle during the upcoming driving condition,
compare the vehicle braking requirement with a predetermined threshold limit, and
control the air bearing valve to assume the second state throughout the upcoming driving condition when the vehicle braking requirement exceeds the predetermined threshold limit.

2. The braking arrangement of claim 1, wherein the control unit is configured to:
receive a signal indicative of a desired vehicle speed for the vehicle, and
control the air bearing valve to transition from the first state to the second state before the vehicle initiates a control of the vehicle speed.

3. The braking arrangement of claim 2, wherein the control unit is further connected to the electric machine, the control unit being configured to:
control the electric machine to generate a torque on the compressor shaft for operating the brake compressor at a predetermined time period after the air bearing valve assumes the second state.

4. The braking arrangement of claim 1, wherein the air bearing arrangement comprises an air journal bearing.

5. The braking arrangement of claim 1, wherein the air bearing arrangement comprises an air thrust bearing.

6. The braking arrangement of claim 1, further comprising an electrical brake resistor arrangement arranged in the air flow conduit at a position downstream the brake compressor.

7. The braking arrangement of claim 1, further comprising an air heating arrangement arranged in the air flow conduit at a position upstream the brake compressor for heating the air supplied to the brake compressor.

8. The braking arrangement of claim 7, wherein the air heating arrangement is formed by the electric machine, wherein air is received and heated by the electric machine and supplied to the brake compressor.

9. The braking arrangement of claim 7, wherein the air heating arrangement is formed by a heat exchanger connected to a liquid cooling system of the vehicle.

10. The braking arrangement of claim 1, further comprising an air flow restriction arrangement arranged in the air flow conduit at a position downstream the brake compressor.

11. A vehicle at least partially propelled by an electric traction motor comprising:
a pressurized brake air tank arranged to supply pressurized air to a pneumatically controlled wheel brake connected to a wheel of the vehicle, and the braking arrangement of claim 1, wherein the pressurized brake air tank is arranged in fluid communication with the air bearing arrangement.

12. A method of controlling a braking arrangement of a vehicle, the braking arrangement comprising:
- an electric machine electrically connected to an electric power source of the vehicle,
- a brake compressor positioned in an air flow conduit of the brake compressor, and
- a compressor shaft mechanically connecting the electric machine and the brake compressor to each other,
- wherein the electric machine is configured to generate a torque on the compressor shaft, the braking arrangement further comprising an air bearing arrangement fluidly connected to a pressurized brake air tank of the vehicle, and
- wherein the air bearing arrangement is suspending the compressor shaft to at least one of the electric machine and the brake compressor, the method comprising:
- determining an upcoming braking event for the vehicle,
- controlling a supply of flow of air from the pressurized brake air tank to the air bearing arrangement before initiation of the braking event, and
- controlling the electric machine to generate a torque on the compressor shaft for operating the brake compressor to pressurize a flow of air at a predetermined time period after the supply of the flow of air from the pressurized brake air tank to the air bearing arrangement has been initiated.

* * * * *